No. 782,648. PATENTED FEB. 14, 1905.
F. GAENSSLEN.
FAUCET.
APPLICATION FILED APR. 2, 1904.
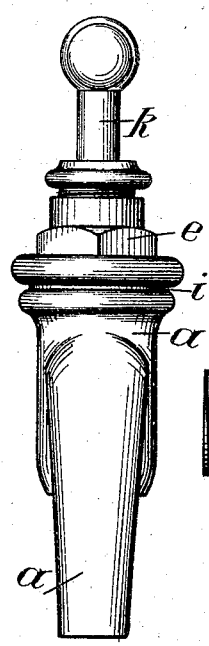
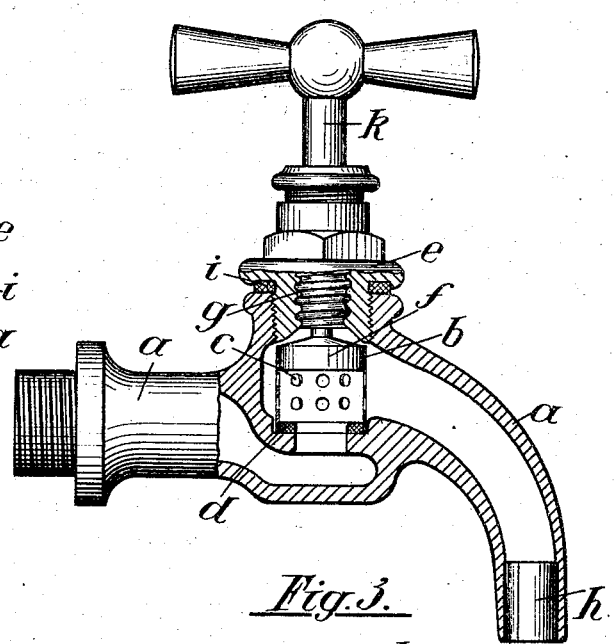
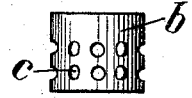
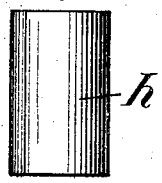
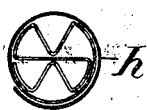

No. 782,648. Patented February 14, 1905.

UNITED STATES PATENT OFFICE.

FRIEDRICH GAENSSLEN, OF GMÜND, GERMANY.

FAUCET.

SPECIFICATION forming part of Letters Patent No. 782,648, dated February 14, 1905.

Application filed April 2, 1904. Serial No. 201,222.

*To all whom it may concern:*

Be it known that I, FRIEDRICH GAENSSLEN, a citizen of the German Empire, residing at Gmünd, Kingdom of Würtemberg, Germany, have invented certain new and useful Improvements in Faucets; and I do hereby declare the following to be a full, clear, and exact description of the invention, such as will enable others skilled in the art to which it appertains to make and use the same.

This invention relates to improvements in faucets, and has for its object the regulation of the water-jet, so as to prevent splattering of the water and maintain the same in a compact column.

The invention has for its further object the provision of means whereby an effective closing of the valve is attained with a small degree of pressure.

In order that my invention may be clearly understood, I have in the accompanying drawings illustrated a preferred embodiment of the same, in which—

Figure 1 is an end view of a faucet. Fig. 2 is a sectional elevation. Figs. 3 and 4 are a side elevation and a transverse section of the valve-casing. Figs. 5 and 6 are respectively an end and side elevation of the discharge attachment.

The faucet $a$ is provided in its valve-chamber with a casing $b$, which has perforations $c$ formed therein. This casing is pressed upon a valve packing or washer $d$ by the bush $e$. The washer encircles the inlet-opening and serves as a valve-seat for the valve $f$, carried by the stem $g$, to which is attached the handle $k$, passing through the threaded bushing $e$, which rests upon the packing $i$.

It will be seen that instead of inserting the washer $d$ in a suitable recess in the valve-seat or securing it by a screw upon the end of the valve it lies upon the valve-seat and is held fast around its outer edge by the perforated socket $b$, within which the valve $f$ moves as a piston. By this arrangement a very soft resilient washer may be employed without its becoming quickly damaged in use or displaced from its position. This feature is also of value in the employment of soft washers in cases where the valve-seat has become eroded without requiring a regrinding. The perforations $c$ in the socket $b$ provide for a uniform regulation of the water-inflow under the control of the valve $b$.

In order to cause the water to flow in a continuous compact column and to obviate the splattering which usually results when water runs from an ordinary faucet onto a flat surface, a discharge attachment $h$ is provided, which is adapted to be placed within the outlet end of any ordinary faucet. This consists of a thin metallic sheet bent upon itself in the manner shown, for instance, in Fig. 5, so as to form a cylinder having its section divided into a number of channels of the same size, the outer extremity of the strip inclosing the channels in a spiral manner. The outer diameter of this socket is very slightly in excess of the inner diameter of the end of the faucet to which it is intended to be applied. By slightly compressing the attachment with the fingers it may be inserted within the faucet and then permitted to expand. It is held tightly in place by its own resilient properties, and is even more securely fixed in position when the water is turned on by reason of the outward pressure of the water tending to expand the socket.

It will be obvious that in the bending of the strip to form the different channels the example given in Fig. 5 need not be followed as a pattern, the essential feature being that the interior of the attachment shall be divided into a number of smaller channels, the more the better, having a cross-section considerably less than their length.

Having thus fully described my invention, what I claim as new, and desire to secure by Letters Patent, is—

1. In a device of the character described, a sheet-metal strip bent to form a cylinder with a plurality of channels therethrough.

2. In a device of the character described, a resilient sheet-metal strip bent to form a cylinder with overlapping edges and with a plurality of channels therethrough.

3. In a device of the character described, a sheet-metal strip bent to form a cylinder having a plurality of channels therethrough of substantially equal cross-sectional area.

4. In a device of the character described, a resilient sheet-metal strip bent to form a cylinder having a plurality of channels therethrough of substantially equal cross-sectional area and of a relatively greater length.

5. In a device of the character described, a resilient sheet-metal strip bent upon itself to form a cylinder having a plurality of channels therethrough of substantially equal cross-sectional area.

6. In a device of the character described, a sheet-metal strip bent upon itself to form a cylinder having its interior divided into segmental channels of substantially the same cross-sectional area.

7. In a device of the character described, a resilient sheet-metal strip bent upon itself to form a cylinder having its interior divided into a plurality of segmental channels of substantially the same cross-section, the opposing walls of the cylinder-channels being movable relative to each other.

In testimony whereof I affix my signature to this specification in the presence of two witnesses.

FRIEDRICH GAENSSLEN.

Witnesses:
  A. B. DRAUTZ,
  W. SCHWAEBSCH.